(12) United States Patent
Chung et al.

(10) Patent No.: US 11,830,105 B2
(45) Date of Patent: Nov. 28, 2023

(54) SERVICE REQUEST PROCESSING UTILIZING MODIFIED VERSIONS OF IMAGES OF COMPUTING DEVICES

(71) Applicant: Dell Products L.P., Round Rock, TX (US)

(72) Inventors: An Chung, Pflugerville, TX (US); Jimmy Henry Wiggers, Cedar Park, TX (US); Ravi Shukla, Bangalore (IN); Jeffrey Scott Vah, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 244 days.

(21) Appl. No.: 17/462,235

(22) Filed: Aug. 31, 2021

(65) Prior Publication Data

US 2023/0069282 A1    Mar. 2, 2023

(51) Int. Cl.
*G06V 20/60* (2022.01)
*G06T 11/00* (2006.01)
*G06T 3/00* (2006.01)
*G06F 18/213* (2023.01)

(52) U.S. Cl.
CPC ............ *G06T 11/00* (2013.01); *G06F 18/213* (2023.01); *G06T 3/00* (2013.01); *G06V 20/60* (2022.01); *G06T 2210/12* (2013.01)

(58) Field of Classification Search
None
See application file for complete search history.

(56) References Cited

U.S. PATENT DOCUMENTS

2021/0110440 A1*  4/2021  Dion .................. G06Q 30/0278

OTHER PUBLICATIONS

J. Redmon et al., "You Only Look Once: Unified, Real-Time Object Detection," arXiv:1506.02640v5, May 9, 2016, 10 pages.
Open Source Computer Vision, "Geometric Image Transformations," https://docs.opencv.org/3.4/da/d54/group_imgproc_transform.html, Accessed Aug. 20, 2021, 22 pages.
J. Korstanje, "Yolo v5 Object Detection Tutorial," https://towardsdatascience.com/yolo-v5-object-detection-tutorial-2e607b9013ef, Sep. 28, 2020, 8 pages.

* cited by examiner

*Primary Examiner* — Guillermo M Rivera-Martinez
(74) *Attorney, Agent, or Firm* — Ryan, Mason & Lewis, LLP

(57) ABSTRACT

An apparatus comprises a processing device configured to obtain a first image, to detect one or more designated types of objects in the first image, at least a given one of the designated types of objects comprising at least a given portion of a computing device associated with a service request and, responsive to detecting the given one of the designated types of objects, to identify features of the given portion of the computing device in the first image. The processing device is also configured to perform an augmentation of the identified features of the given portion of the computing device to generate a second image, the second image comprising a modified version of the first image that contains the given portion of the computing device and excludes one or more other portions of the first image, and to process the service request utilizing the second image.

20 Claims, 14 Drawing Sheets

OBJECT PRESENCE DETECTION 303

IMAGE 403

MODEL DOES NOT DETECT OBJECT, CONFIDENCE DOES NOT EXCEED THRESHOLD

IMAGE 401

MODEL DETECTS OBJECT, CONFIDENCE EXCEEDS THRESHOLD

SERVICE REQUEST PROCESSING UTILIZING MODIFIED VERSIONS OF IMAGES OF COMPUTING DEVICES

FIELD

The field relates generally to information processing, and more particularly to device management in information processing systems.

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices.

SUMMARY

Illustrative embodiments of the present disclosure provide techniques for service request processing utilizing modified versions of images of computing devices.

In one embodiment, an apparatus comprises at least one processing device comprising a processor coupled to a memory. The at least one processing device is configured to perform the steps of obtaining a first image and detecting one or more designated types of objects in the first image, at least a given one of the one or more designated types of objects comprising at least a given portion of a computing device associated with a service request. The at least one processing device is also configured to perform the step of, responsive to detecting the given one of the one or more designated types of objects in the first image, identifying features of the given portion of the computing device in the first image. The at least one processing device is further configured to perform the steps of performing an augmentation of the identified features of the given portion of the computing device to generate a second image, the second image comprising a modified version of the first image that contains the given portion of the computing device and excludes one or more other portions of the first image, and processing the service request utilizing the second image.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
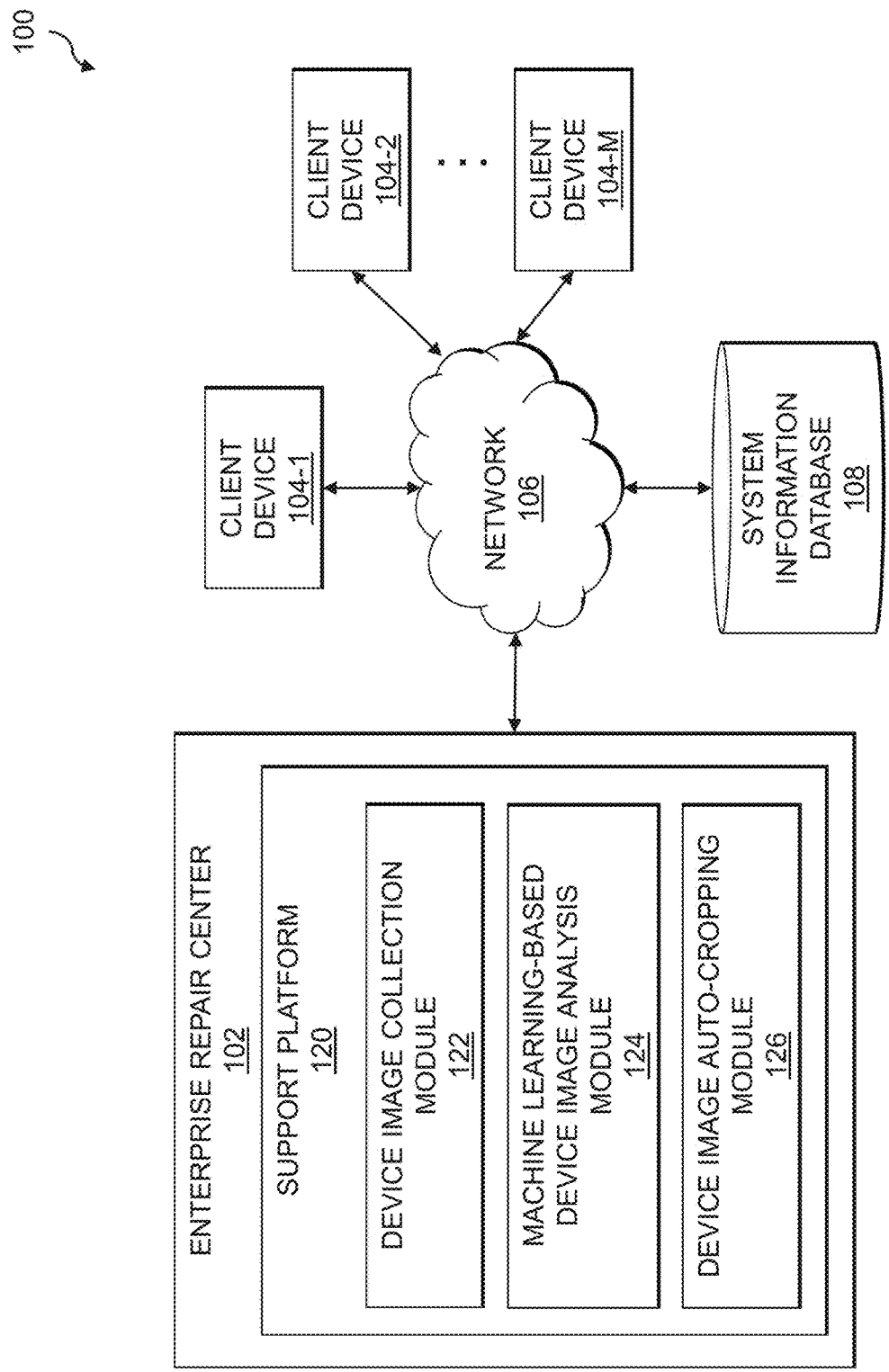
FIG. 1 is a block diagram of an information processing system configured for service request processing utilizing modified versions of images of computing devices in an illustrative embodiment.

FIG. 1 shows an information processing system 100 configured in accordance with an illustrative embodiment. The information processing system 100 is assumed to be built on at least one processing platform and provides functionality for service request processing utilizing modified versions of images of computing devices. The modified version of the images of computing devices may comprise cropped versions of the images of the computing devices which are generated automatically. The auto-cropping of objects in the images of computing devices may be used for qualitative assessment using deep learning techniques. The information processing system 100 includes an enterprise repair center 102 and a plurality of client devices 104-1, 104-2, ... 104-M (collectively, client devices 104) that are coupled to a network 106. Also coupled to the network 106 is a system information database 108, which may store various information relating to the client devices 104 (e.g., device images thereof).

The enterprise repair center 102 in the FIG. 1 embodiment includes a support platform 120, which is assumed to provide support services for the client devices 104. The client devices 104 may comprise, for example, physical computing devices such as Internet of Things (IoT) devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as virtual machines (VMs), containers, etc.

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art. In some embodiments, the client devices 104 comprise assets of an information technology (IT) infrastructure operated by an enterprise, and the enterprise repair center 102 is configured to provide support services for such assets using the support platform 120.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

As noted above, in some embodiments the support platform 120 of the enterprise repair center 102 is used for providing support services for an enterprise system (e.g., an IT infrastructure comprising the client devices 104). For example, an enterprise may subscribe to or otherwise utilize the support platform 120 to manage a set of assets (e.g., the client devices 104) operated by users of the enterprise. As used herein, the term "enterprise system" is intended to be construed broadly to include any group of systems or other computing devices. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The system information database 108, as discussed above, is configured to store and record information relating to the client devices 104 or other assets that are managed using the support platform 120. Such information illustratively includes device images, including device images before and after auto-cropping using the techniques described in further detail elsewhere herein. Such information may also or alternatively include system state information, logs of repairs and troubleshooting actions performed on the client devices 104, details of warranties or other support services subscribed to for different ones of the client devices 104, etc. The system information database 108 may also include logs of service requests, and device images associated with such service requests. Such device images may include device identifying information and user identifying information for the users submitting the service requests. The system information database 108 may further include training data for a machine learning model used to analyze device images. The system information database 108 in some embodiments is implemented using one or more storage systems or devices associated with the support platform 120. In some embodiments, one or more of the storage systems utilized to implement the system information database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise repair center 102 and/or support platform 120, as well as to support communication between the enterprise repair center 102, the support platform 120 and other related systems and devices not explicitly shown.

The support platform 120 may be operated by a hardware vendor that manufactures and sells computing devices (e.g., desktops, laptops, tablets, smartphones, etc.), and the client devices 104 may represent computing devices sold by that hardware vendor. The support platform 120, however, is not required to be operated by a hardware vendor that manufactures and sells computing devices. Instead, the support platform 120 may be offered as a service to provide support for computing devices that are sold by any number of hardware vendors. The client devices 104 may subscribe to the support platform 120, so as to provide support including troubleshooting of hardware and software components of the client devices 104. Various other examples are possible.

In some embodiments, the client devices 104 may implement host agents that are configured for automated transmission of information in conjunction with service requests that are submitted to the support platform 120. Such information may include device images for a computing device to be serviced (e.g., one of the client devices 104). Such host agents may also be configured to automatically receive from the support platform 120 various support information (e.g., details of troubleshooting and repair actions performed on or for the client devices 104, support services that are available to the client devices 104, etc.). The host agents may comprise support software that is installed on the client devices 104.

It should be noted that a "host agent" as this term is generally used herein may comprise an automated entity, such as a software entity running on a processing device. Accordingly, a host agent need not be a human entity.

As shown in FIG. 1, the enterprise repair center 102 includes the support platform 120. The support platform 120, as will be described in further detail below, is configured to analyze device images submitted with servicing requests for qualitative assessment. For example, the device images (or auto-cropped portions thereof, as will be described in further detail below), may be used to determine a type or cause of damage to a computing device or one or more components thereof, to diagnose and remediate issues encountered on computing devices, etc.

Although shown as an element of the enterprise repair center 102 in this embodiment, the support platform 120 in other embodiments can be implemented at least in part externally to the enterprise repair center 102, for example, as a stand-alone server, set of servers or other type of system coupled to the network 106. In some embodiments, the support platform 120 or components thereof may be implemented at least in part within one or more of the client devices 104.

The support platform 120 in the FIG. 1 embodiment is assumed to be implemented using at least one processing device. Each such processing device generally comprises at least one processor and an associated memory, and implements one or more functional modules for controlling certain features of the support platform 120. In the FIG. 1 embodiment, the support platform 120 includes a device image collection module 122, a machine learning-based device image analysis module 124, and a device image auto-cropping module 126.

The support platform 120 is configured to identify servicing requests submitted by users of the client devices 104 for servicing of computing devices (which may be the client devices 104 themselves). Such servicing requests are assumed to include images of the computing devices to be serviced, where such images may include background noise, and may show the computing devices (or portions thereof) with various different object positioning, object orientation, and object capture angle.

The machine learning-based device image analysis module 124 is configured to utilize one or more machine learning models to process the device images. Such processing may include object detection (e.g., detecting whether one or more designated types of objects are present in a given image) and corners prediction (e.g., if a designated object type is detected, locations of the corners of at least a given portion of the computing device are predicted). The device image auto-cropping module 126 is configured to utilize output from the machine learning-based device image analysis module 124 to perform an augmentation of the first image to generate a second image, where the augmentation utilizes the predicted corner locations to automatically crop the first image such that the given portion of the computing device is shown and other portions of the computing device (as well as background noise) are excluded. The second image also accounts for variations in object positioning, object orientation and object capture angle in the first image as will be described in further detail elsewhere herein.

It is to be appreciated that the particular arrangement of the enterprise repair center 102, client devices 104, support platform 120, device image collection module 122, machine learning-based device image analysis module 124, and device image auto-cropping module 126 illustrated in the FIG. 1 embodiment is presented by way of example only, and alternative arrangements can be used in other embodiments. As discussed above, for example, the support platform 120 or one or more components thereof may be implemented external to the enterprise repair center 102. As another example, the functionality associated with the device image collection module 122, the machine learning-based device image analysis module 124, and the device image auto-cropping module 126 may be combined into fewer modules, or separated across more modules with the multiple modules possibly being implemented with multiple distinct processors or processing devices.

At least portions of the device image collection module 122, the machine learning-based device image analysis module 124, and the device image auto-cropping module 126 may be implemented at least in part in the form of software that is stored in memory and executed by a processor.

It is to be understood that the particular set of elements shown in FIG. 1 for service request processing utilizing modified versions of images of computing devices is presented by way of illustrative example only, and in other embodiments additional or alternative elements may be used. Thus, another embodiment may include additional or alternative systems, devices and other network entities, as well as different arrangements of modules and other components.

By way of example, in other embodiments, the support platform 120 may be implemented external to the enterprise repair center 102, such that the enterprise repair center 102 can be eliminated.

The support platform 120 and other portions of the system 100, as will be described in further detail below, may be part of cloud infrastructure.

The client devices 104, the support platform 120 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 104 and the support platform 120, or components thereof, may be implemented on respective distinct processing platforms, although numerous other arrangements are possible. For example, in some embodiments at least portions of the support platform 120 and one or more of the client devices 104 are implemented on the same processing platform. A given client device (e.g., 104-1) can therefore be implemented at least in part within at least one processing platform that implements at least a portion of the support platform 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the enterprise repair center 102, the support platform and the client devices 104, the system information database 108, or portions or components thereof, to reside in different data centers. Numerous other distributed implementations are possible. The support platform 120 can also be implemented in a distributed manner across multiple data centers.

Additional examples of processing platforms utilized to implement the client devices 104, support platform 120 and other components of the system 100 in illustrative embodiments will be described in more detail below in conjunction with FIGS. 13 and 14.

It is to be appreciated that these and other features of illustrative embodiments are presented by way of example only, and should not be construed as limiting in any way.

Figure 2:
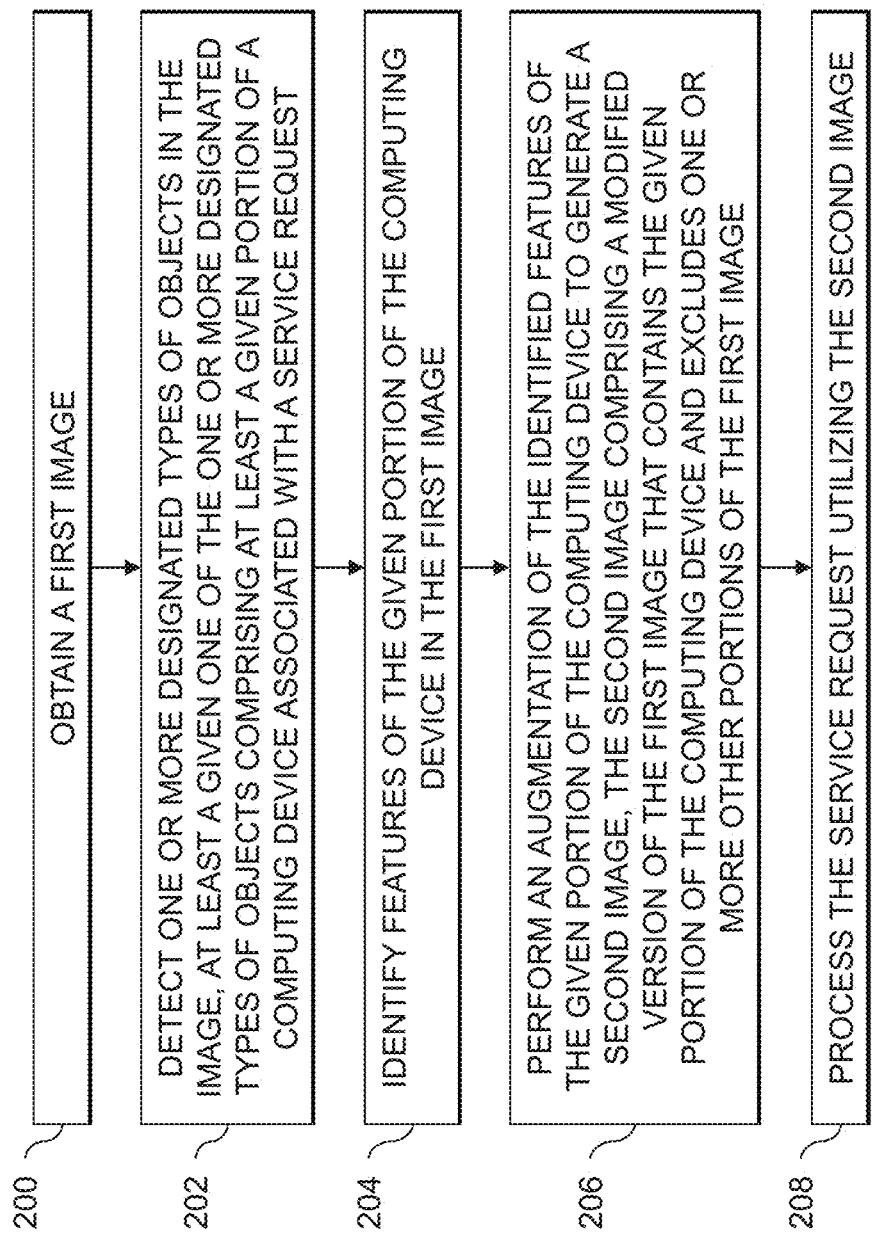
FIG. 2 is a flow diagram of an exemplary process for service request processing utilizing modified versions of images of computing devices in an illustrative embodiment.

An exemplary process for service request processing utilizing modified versions of images of computing devices will now be described in more detail with reference to the flow diagram of FIG. 2. It is to be understood that this particular process is only an example, and that additional or alternative processes for service request processing utilizing modified versions of images of computing devices may be used in other embodiments.

In this embodiment, the process includes steps 200 through 208. These steps are assumed to be performed by the support platform 120 utilizing the device image collection module 122, the machine learning-based device image analysis module 124, and the device image auto-cropping module 126. The process begins with step 200, obtaining a first image. The first image may be part of a service request (e.g., a request for servicing of a computing device, such as a laptop, desktop, tablet, smartphone, etc.). In step 202, one or more designated types of objects in the first image are detected. At least a given one of the one or more designated types of objects comprises at least a given portion of a computing device associated with the service request. Step 202 may utilize an object detection machine learning model, such as a convolutional neural network (CNN) model. The CNN model may be implemented as a You Only Look Once (YOLO) object detection machine learning model that outputs a first value if the given one of the one or more designated types of objects are detected in the image and outputs a second value if the given one of the one or more designated types of objects are not detected in the image.

In step 204, responsive to detecting the given one of the one or more designated types of objects in the first image, features of the given portion of the computing device in the first image are identified. An augmentation of the identified features of the given portion of the computing device is performed in step 206 to generate a second image. The second image comprises a modified version of the first image that contains the given portion of the computing device and excludes one or more other portions of the first image. For example, the given portion of the computing device may comprise a screen of the computing device, where the second image comprises a cropping that removes any background noise or portions of the first image except for the given portion of the first image which shows the screen of the computing device. As another example, the given portion of the computing device may comprise a set of ports of the computing device, where the second image comprises a cropping that removes any background noise or portions of the first image except for the given portion of the first image which shows the set of ports.

The identified features may comprise corners of the given portion of the computing device, and step 204 may utilize a corners prediction machine learning model, such as a corners prediction machine learning model that utilizes object detection to make predictions for each of a set of corner classes and outputs one or more predictions of locations of the corners of the given portion of the computing device in a designated coordinate format. The designated coordinate format may comprise a normalized coordinate format. The designated coordinate format comprises a normalized coordinate format that specifies center coordinates of the given portion of the computing device in the first image and a bounding box width and height of the given portion of the computing device in the first image. Other object detection models with different coordinate systems may be utilized, and embodiments are not limited to a YOLO object detection model and its associated coordinate system. The set of corner classes may comprise four corner classes, and each of the one or more predictions comprises coordinates of locations of four corners of the given portion of the computing device in the first image. Step 206 may comprise performing a trapezoidal augmentation that stretches each of the four corners of the given portion of the computing device in the first image to a predefined image resolution. The trapezoidal augmentation may take as input a first list comprising the predicted coordinates of the locations of the four corners of the given portion of the computing device in the first image and a second list comprising the predefined image resolution, and may apply a transformation to the first list to produce the second image with the predefined image resolution specified in the second list.

The service request is processed in step 208 utilizing the second image. Step 208 may include classifying a type of damage associated with at least one component of the computing device based at least in part on one or more visual characteristics of the given portion of the computing device in the second image. Step 208 may also or alternatively comprise classifying a type of issue encountered on the computing device based at least in part on one or more visual characteristics of the given portion of the computing device in the second image.

Illustrative embodiments provide an auto-cropping approach for image processing, which addresses the problem of image variability through the use of a unique deep learning-based approach. The deep learning approach used in some embodiments automatically pinpoints corners of an object (e.g., a rectangular shaped object), and utilizes an augmentation function (e.g., a trapezoidal augmentation function) to transform images to a standard shape (e.g., a standard rectangular shape). This solution enables near-infinite optionality on how images focused on specific objects can be captured, and works with any image regardless of background noise, object position, object orientation, and object capture angle.

Image collection may be used for various purposes, including by a support platform (e.g., support platform 120 of enterprise repair center 102) for use in obtaining qualitative information about device failures by leveraging computer vision technology to detect failure patterns. Computer vision technology is a field of artificial intelligence (AI) that trains computers to interpret and understand the visual world. Due to variations in image collection processes (e.g., across different sites of a repair center, across different repair centers, from different end-users and via different end-user facing social media channels, etc.), images are inconsistent in quality due to variables such as object positioning, object orientation, and object capture angle. Variability can also be introduced in the form of non-object related image features, such as background noise, and is generally detrimental to achieving high accuracy AI models used for qualitative assessment of specific objects or features.

Variability of image collection processes across global repair centers and different end users (e.g., including various types of end-user facing social media channels) can strongly impact consistency in image quality, including variables such as object positioning, object orientation, and object capture angle. Variability in object positioning refers to objects appearing in different locations within the field of view (FOV) in different images. Variability in object orientation refers to objects appearing in different orientations within the FOV in different images. Variability in object capture angle refers to images being captured with non-orthogonal angles to objects, causing distortion in object shape. Device images may also be captured with non-essential features, such as background noise, which is generally detrimental to achieving high accuracy AI models for qualitative assessment. Background noise may include extraneous objects (e.g., objects of no interest) that are part of an image. Variability in device image consistency reduces a computer vision algorithm's ability to qualitatively assess an object of focus.

Creating consistency in device image collection processes across global repair centers may be achieved with improvements to processes, through the purchase of high-quality cameras and lighting equipment, etc. Such process changes, however, can incur increased costs as additional processes are not conducive to repair center key performance indicators (KPIs) including cycle time and time to repair. For example, requiring that objects be moved, or adjusting object position, orientation and angle to some uniform standard prior to image capture can increase cycle time and time to repair, as well as require training of the individuals performing such adjustments. Similarly, upgrading camera and lighting equipment also incurs increased costs as high quality image capture stations add to the cost per image due to amortized capital expenditures.

The solutions described herein improve consistency and reduce cost with a software-based solution that can be applied at any point of time after image capture. This is in contrast with hardware or process-based improvements. The auto-cropping methods in some embodiments utilize a deep learning approach including a series of three image processing techniques for correcting object position, correcting object orientation, correcting object capture angle, and removing background noise. It should be noted that "correcting" the object position, object orientation and object capture angle refers to standardizing or reducing the variability in object position, object orientation and object capture angle across different device images to focus on designated objects of interest (or specific portions thereof). Advantageously, the solutions described herein are low cost, with no process impacts for image capture and no need for additional hardware purchases. In some embodiments, a single image is used as input, with that image being processed through three components or stages applied in a sequential order to create a clean output image.

Figure 3:
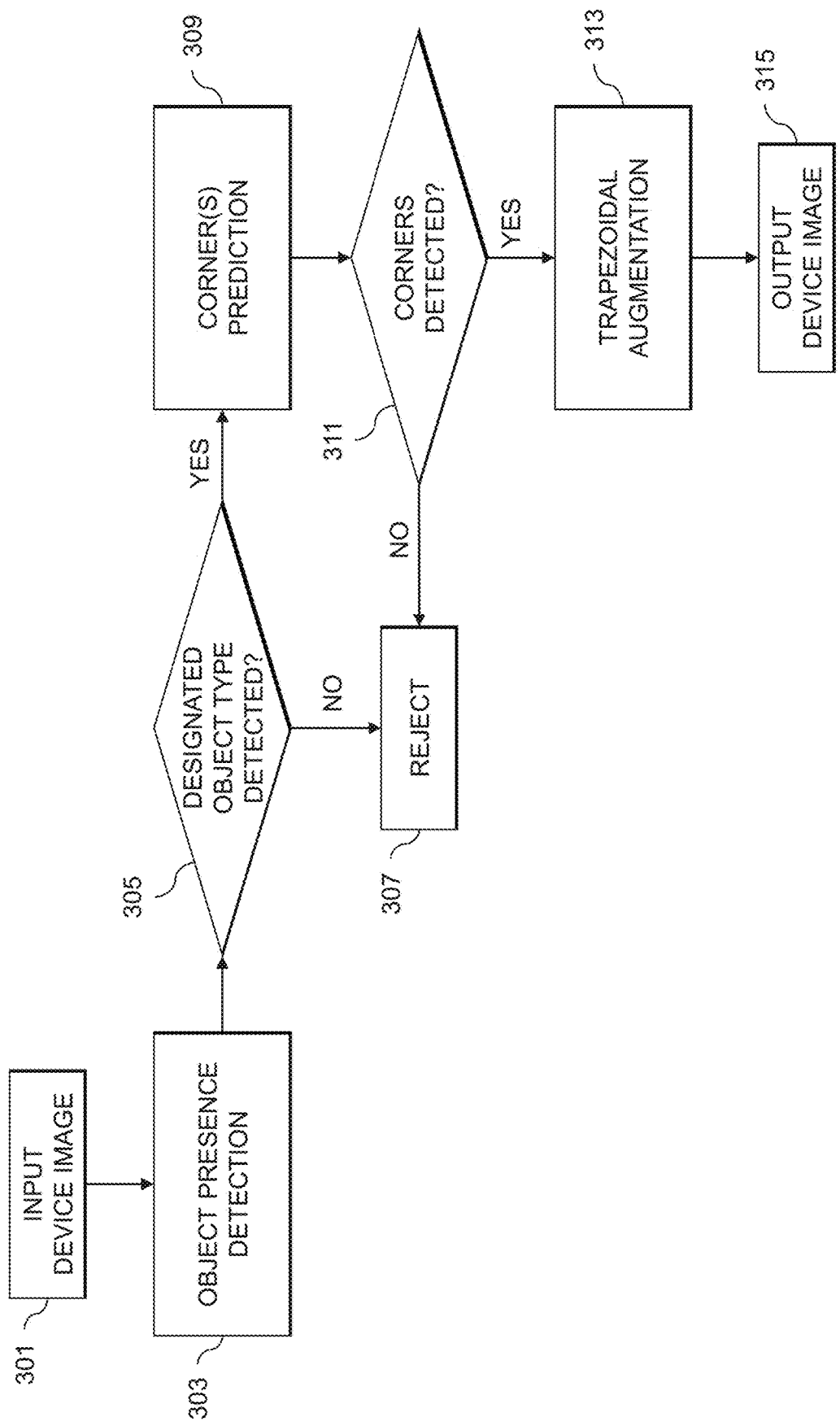
FIG. 3 shows a process flow for device image analysis including object presence detection, corners predication and trapezoidal augmentation in an illustrative embodiment.

FIG. 3 shows an overall system flow, including an input image 301 and output image 315. The first stage or component is application of object presence detection logic 303. A determination is made in block 305 as to whether one or more designated object types are detected following the object presence detection. If not, the input image 301 is rejected 307. If one or more designated object types are detected, the system flow proceeds to the second stage or component, corners prediction logic 309. A determination is made in block 311 as to whether corners are detected following the corners prediction. If not, the input image 301 is rejected 307. If corners are detected, the system flow proceeds to the third stage or component, trapezoidal augmentation logic 313. Following trapezoidal augmentation, the output image 315 is provided. Additional details regarding the object presence detection logic 305, corners prediction logic 309 and trapezoidal augmentation logic 313 will now be described.

Figure 4:
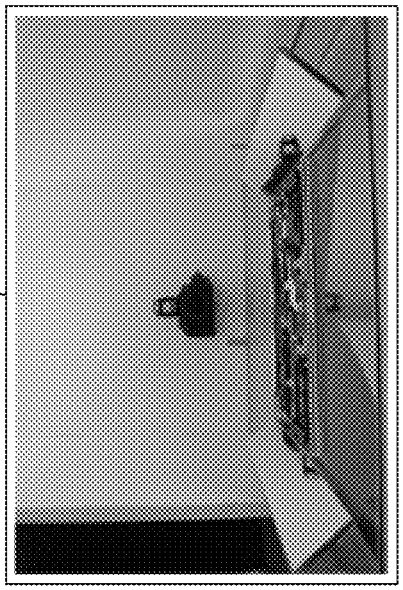
FIG. 4 shows an example of object presence detection in an illustrative embodiment.
Figure 4:
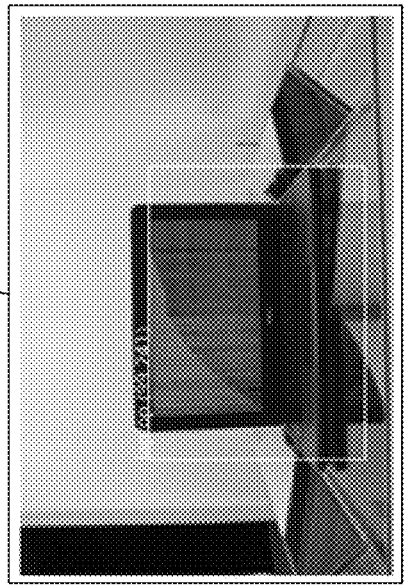

Object presence detection logic 305, includes determining the presence of one or more objects to ensure that only designated object types of interest are processed. The designated object types may vary based on use case. When analyzing computing device images, for example, designated object types may include device screen (e.g., a liquid crystal display (LCD)), a palm rest and/or keyboard, ports, front, back or side covers, etc. In some embodiments, the object presence detection logic 305 utilizes an object detection model, such as a YOLO object detection model (e.g., a YOLO v5 object detection model). Objection detection models or algorithms, such as YOLO, are able to quickly detect object presence. The YOLO object detection model, for example, takes any image as input and outputs a value "true" if a designated object type is detected or a value of "false" if the designated object type is not detected. Only images with "true" values are considered for processing in the next step (e.g., corners prediction). FIG. 4 shows an example of object presence detection logic 303, where a first image 401 outputs a value of "true" as a particular object type (e.g., a laptop) is detected (e.g., with a confidence level exceeding some designated confidence threshold) and a second image 403 outputs a value of "false" as the particular object type is not detected (e.g., the confidence level is below the designated confidence threshold).

Figure 5:
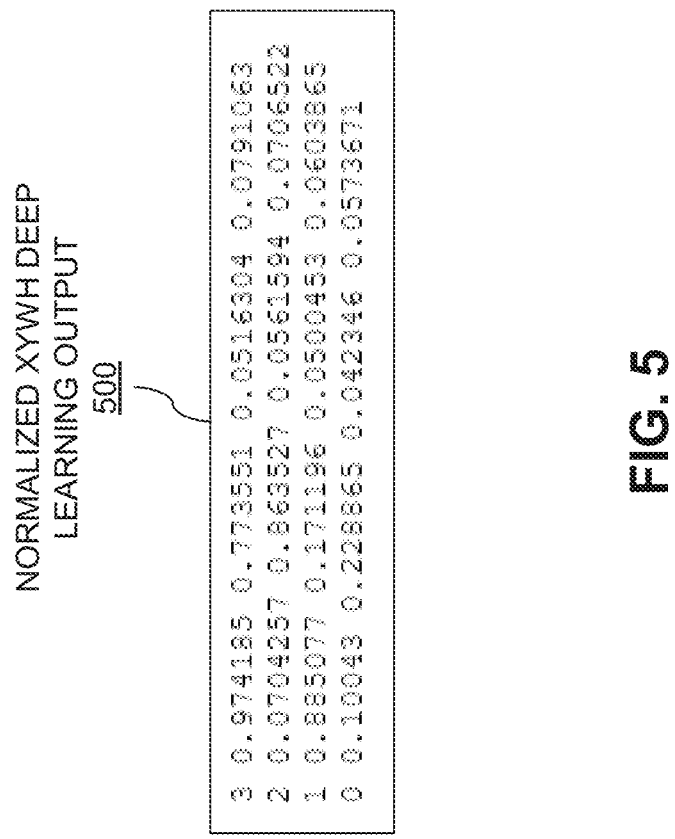
FIG. 5 shows an example of normalized deep learning output for corners prediction in an illustrative embodiment.
Figure 6:
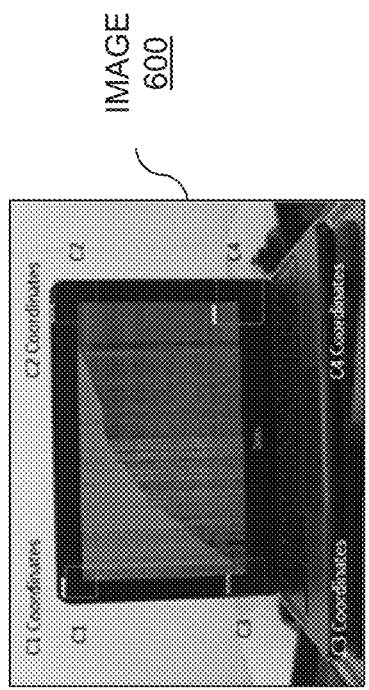
FIG. 6 shows an example of corners prediction in an illustrative embodiment.

If a designated object type is detected using the object presence detection logic 303 (e.g., the output of decision block 305 is yes), processing proceeds to corners prediction logic 309. Corners prediction logic 309 will locate the corners of the object using object detection by making corner predictions and assigning each corner to one of a set of corner classes. For a rectangular shaped object, for example, there are four corners and four corner classes [C1, C2, C3, C4]. The model used for corners prediction may be trained with a large number of ground truth labels (e.g., thousands of ground truth labels). Once the corner predictions are made for a particular image, the output of the object detection model may be saved (e.g., as a text file) with a normalized XYWH coordinate format. The normalized XYWH format refers to a YOLO-specific output format which prescribes the center coordinates as X and Y, with bounding box width and height as W and H. While some embodiments are described with respect to the normalized XYWH output format, various other output formats may be utilized (e.g., by changing the mathematical processing). The normalized XYWH output means that the X, Y, W and H values are divided by the size of the image, such that all values in the XYWH output fall between 0 and 1. The coordinates (e.g., of the corners) are checked and cleansed in a standardization script which looks for duplicate or missing predictions. Duplicate coordinates may be reconciled by eliminating low confidence predictions and keeping high confidence predictions. If the coordinate set does not contain at least one of each of the classes (e.g., at least one of each of the four classes [C1, C2, C3 and C4] for a rectangular shaped object), then the image is rejected (e.g., in block 307 following decision block 311). FIG. 5 shows an example of normalized XYWH deep learning output 500, and FIG. 6 shows an image 600 with corner coordinates for corner classes [C1, C2, C3, C4] shown and labeled following application of the corners prediction logic 309.

Trapezoidal augmentation logic 313 is then applied (e.g., assuming that corners are detected and the output of the decision block 311 is yes). The trapezoidal augmentation uses the normalized XYWH coordinates (or other suitable coordinate output) and applies a trapezoidal augmentation to stretch the corners to a predefined resolution. The predefined resolution may be dependent on the object type. For example, an LCD object type for the screen of a laptop may be 1600×900, while a ports object type for ports on the side or rear of the laptop may be 300×3600. Various other object types (e.g., palm rest and/or keyboard, front, rear or side views of a computer case or other housing, etc.) may use different predefined resolutions. Further, the specific examples of predefined resolutions given for the LCD and ports object types are given by way of example only. Different types or models of laptops, tablets, smartphones and other computing devices with LCD or other types of display screens may utilize aspect ratios other than 16:9 (e.g., such as 16:10, 4:3, 3:2, etc.), which may be associated with different predefined resolutions.

Figure 7:
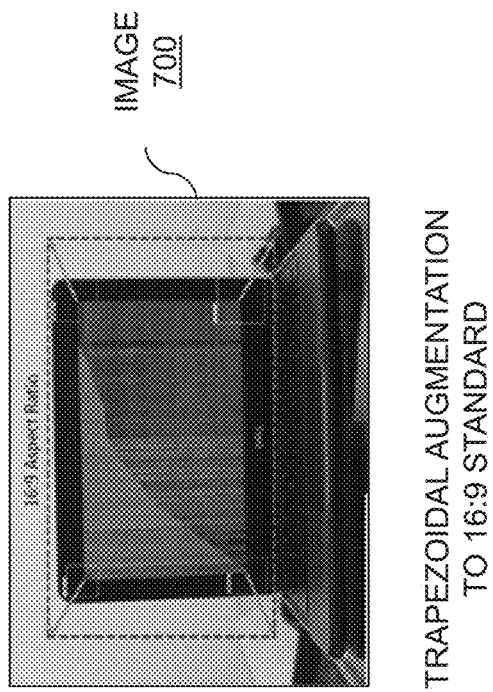
FIG. 7 shows an example of trapezoidal augmentation in an illustrative embodiment.

Trapezoidal augmentation has two input lists. The first input list is created by taking the normalized XYWH coordinate predictions, and un-normalizes the coordinates to their original size. The second list is the predefined resolution. Consider a first input list [[89,1505], [2993,1537], [109,3233], [2985,3100]], and a second input list with the predefined 1600×900 resolution of [[0,0], [1600,0], [0,900], [1600,900]] for an LCD object type. A computer vision function, such as the Open Source Computer Vision Library (OpenCV) function called cv2.perspectiveTransform is then applied to make the transformation. The resulting output image has the background removed and the object normalized to the predefined aspect resolution. FIG. 7 shows application of the trapezoidal augmentation logic 313 for an image 700, where the augmentation is to the 16:9 standard.

FIGS. 8-12 show various examples of input images (801, 901, 1001, 1101 and 1201) and the resulting output images (815, 915, 1015, 1115 and 1215) following application of the FIG. 3 system flow. Conventional approaches would require the input images of FIGS. 8-12 to be captured under optimal conditions, with pristine lighting, restricted orientation and a fixed angle. Use of the FIG. 3 system flow reduces such restrictions, and reduces image rejection by enabling near-infinite optionality on how the input images can be captured. The auto-cropping solution described is capable of isolating the objects of interest (e.g., rectangular objects such as LCD or other display screens, palm rest and/or keyboards, ports, etc.) regardless of object position, object orientation, object capture angle, and background noise.

Figure 8:
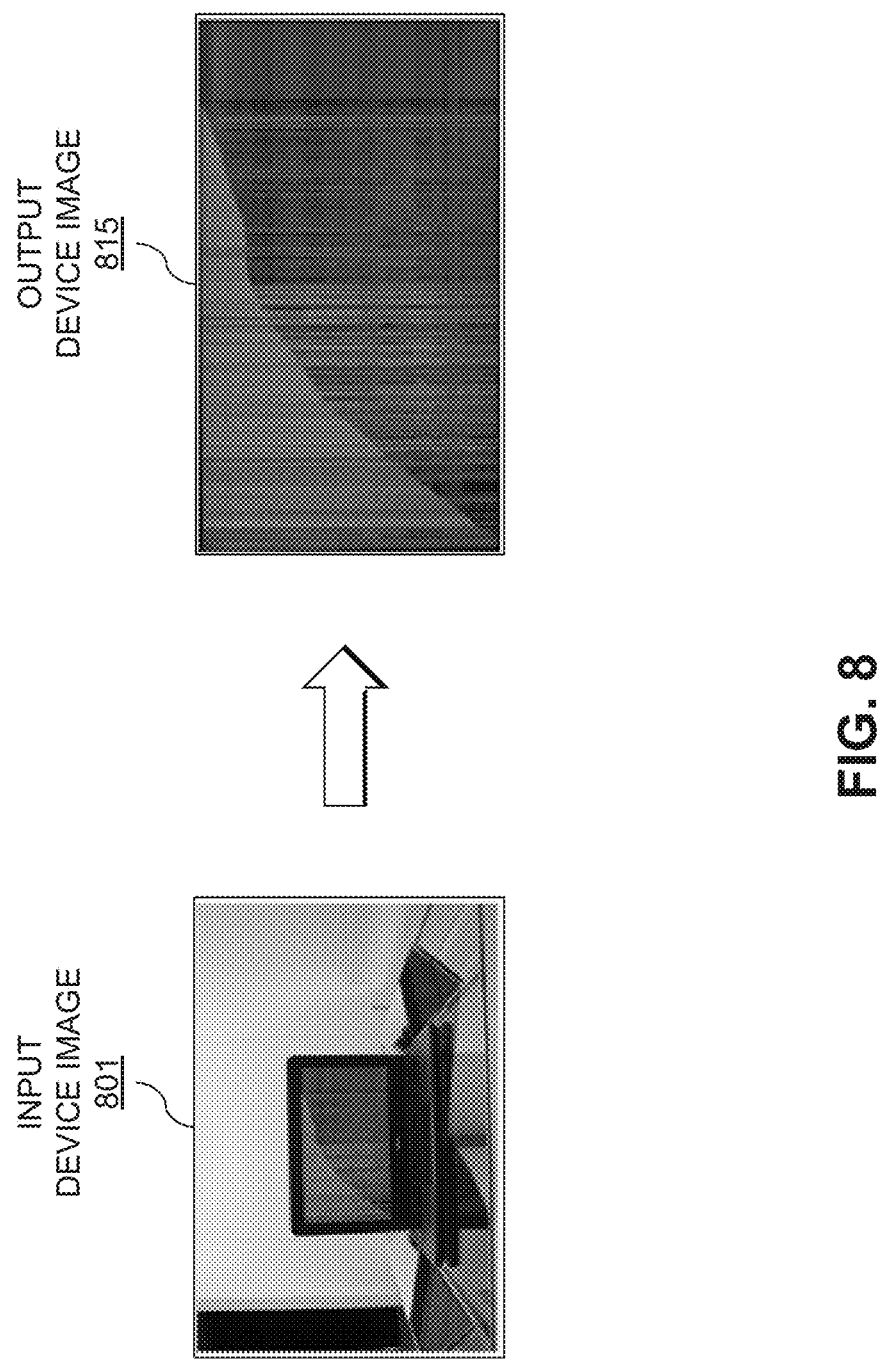
FIG. 8 shows an example of an input device image and an output device image following processing using the FIG. 3 process flow in an illustrative embodiment.

FIG. 8 shows the input image 801 and output image 815 for the LCD screen designated object type, and continues the example shown in FIGS. 4-7 discussed above. Here, the LCD screen may have a pattern of lines that may be indicative of a particular type or cause of damage or issue(s) encountered on the laptop. For example, certain types of damage (e.g., as may be the result of defects in a screen hinge, loose wiring, normal or excess wear and tear, software issues) can result in different known patterns of lines (or other damage, such as cracks, discoloration, etc.) on the LCD screen. Thus, knowledge of the type of damage or issue(s) encountered can be used for streamlining diagnostic and repair processes. The input image 801, for example, may be provided by an end-user that is seeking service or repair of the LCD screen of the laptop, with the input image 801 being provided to a support platform of a repair center for damage assessment. The output image 815 may be used for determining the potential cause of damage or issue(s) encountered (e.g., damage or issue(s) resulting from hardware and/or software defect(s), normal wear and tear, end-user action(s) such as dropping the laptop, etc.), the type of damage or issue(s) encountered, suitable diagnostic or repair actions (e.g., whether the screen can be repaired or whether it needs to be replaced), etc. Such information is valuable for streamlining diagnostic and repair processes.

For example, by determining the potential cause and type of damage in advance, the repair center may identify whether diagnostic or repair actions are covered under a warranty or not. Knowing the potential cause and type of damage or issue(s) encountered on a particular computing device in advance may be further advantageous for determining whether the computing device needs to be sent to a repair center or whether the damage or issue(s) encountered can be remediated remotely at the end-user's location, for routing the computing device to particular repair center if the damage or issue cannot be remediated remotely at the end-user's location, for dispatching or shipping parts that may be needed for remediating the damage or issue(s) encountered for a particular computing device (e.g., to the end-user's location, to a repair center that is the destination for that computing device, etc.). Routing the computing device to a suitable repair center may include routing the computing device to a repair center that is equipped to provide troubleshooting or repair of the type of damage or issue(s) encountered on a particular computing device, to a repair center that has available supplies for repairing the type of damage or issue encountered on a particular computing device, to a repair center that has suitable personnel capable of repairing the type of damage or issue(s) encountered on a particular computing device, etc.

Figure 9:
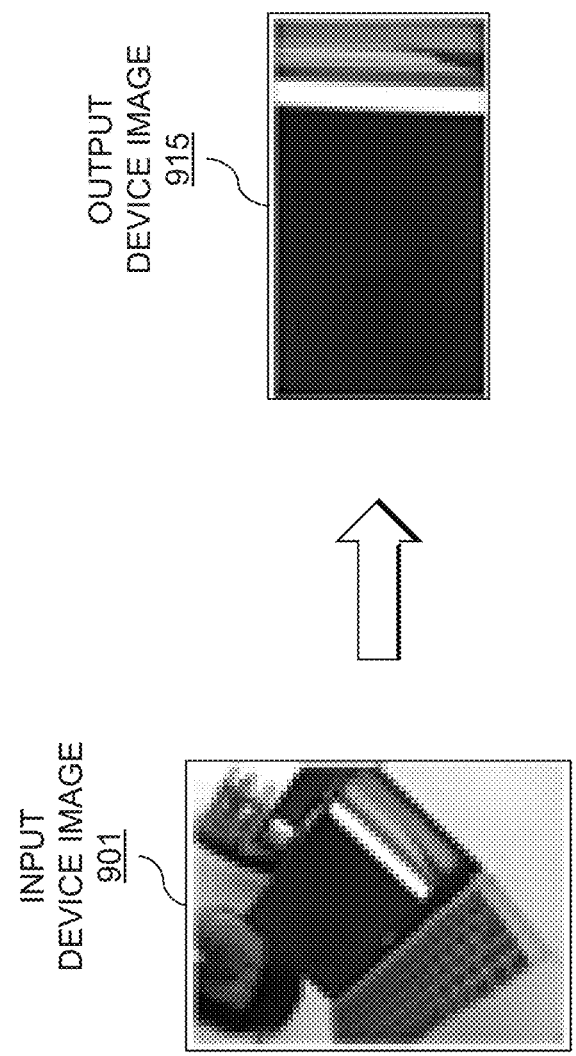
FIG. 9 shows another example of an input device image and an output device image following processing using the FIG. 3 process flow in an illustrative embodiment.

FIG. 9 shows an input image 901 of a laptop and its screen, with the output image 915 isolating the LCD object type (e.g., the screen of the laptop) where the input image 901 has background noise and a sideways orientation. The input image 901, for example, may be one collected through an end-user facing social media channel using a smartphone camera. Similar to the example of FIG. 8, the particular lines, patterns, cracks or other damage or issues in the output image 915 of the screen may be used for diagnosing the potential cause of the damage or issue(s) encountered.

Figure 10:
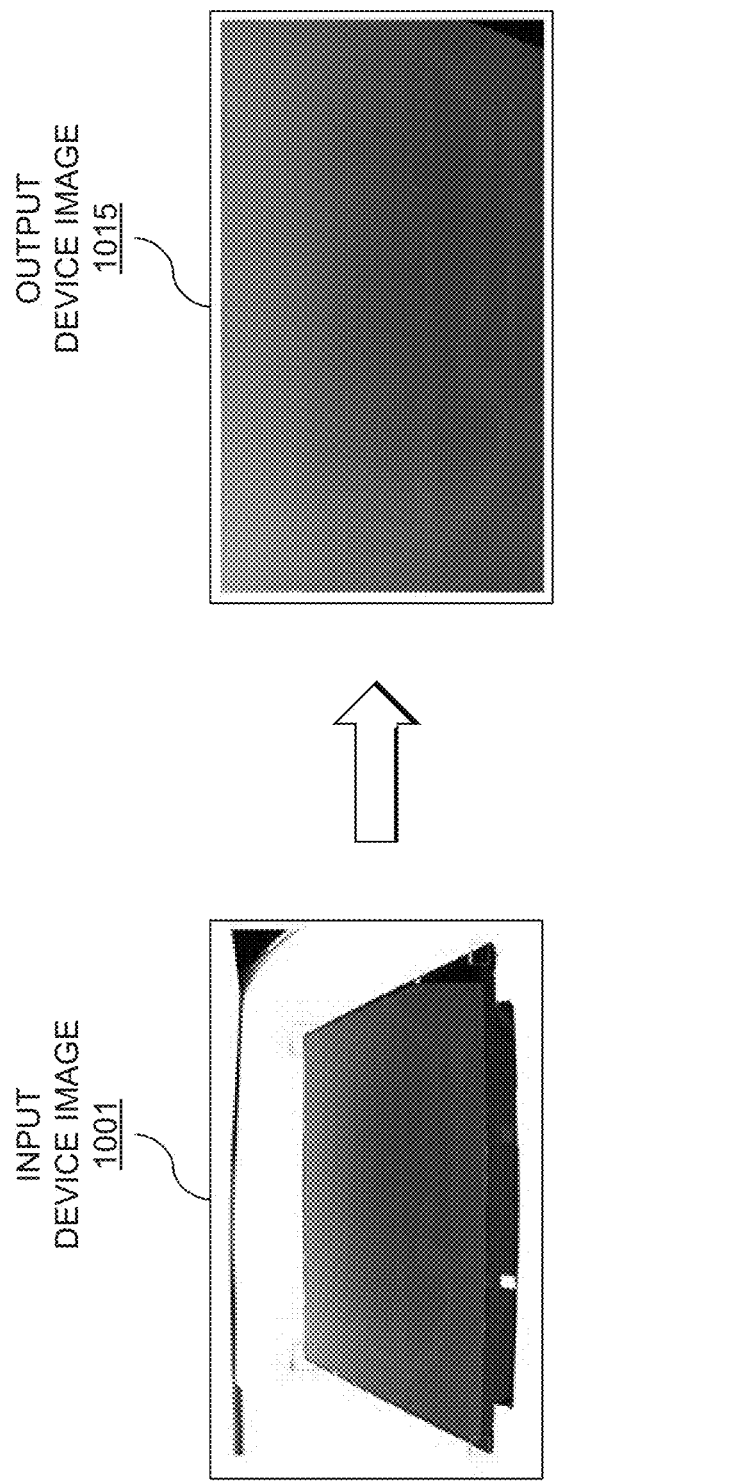
FIG. 10 shows another example of an input device image and an output device image following processing using the FIG. 3 process flow in an illustrative embodiment.

FIG. 10 shows an input image 1001 of a screen, with the output image 1015 correcting for the object capture angle of the input image 1001. The FIG. 10 example demonstrates that application of the FIG. 3 system flow can isolate the screen even where the input image 1001 has a distorted object capture angle. The input image 1001, for example, may be captured in a controlled setting such as in a repair center's photo booth during a screen visual mechanical inspection process.

Figure 11:
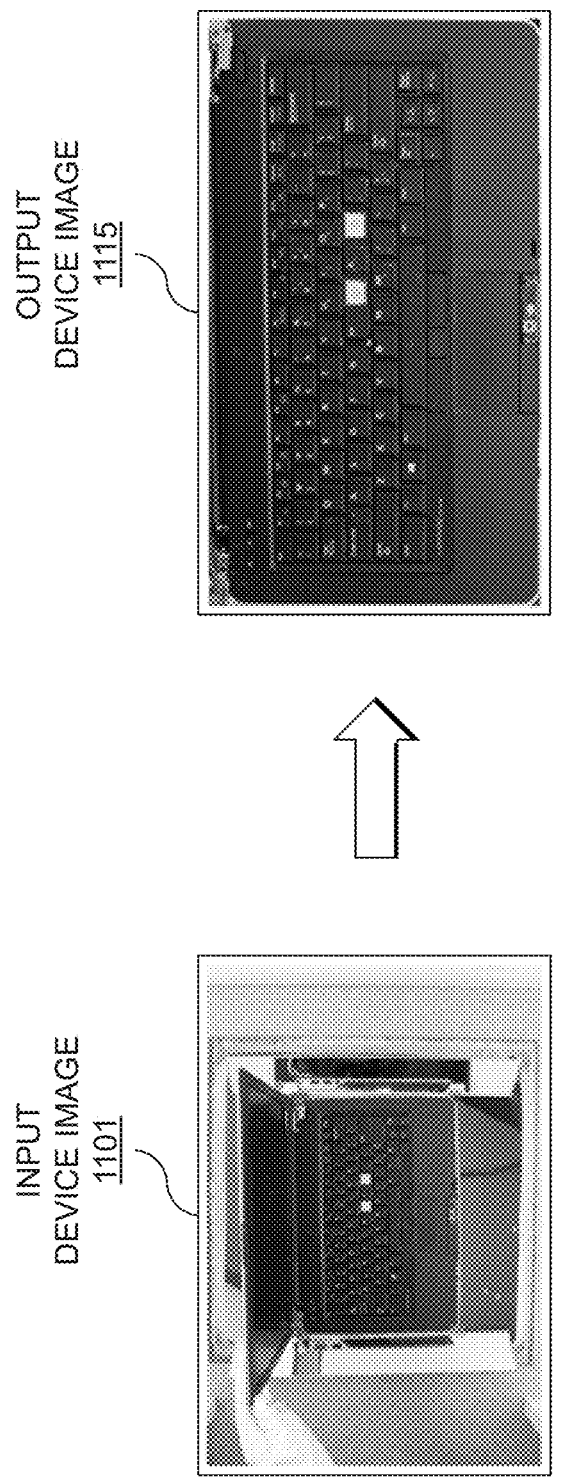
FIG. 11 shows another example of an input device image and an output device image following processing using the FIG. 3 process flow in an illustrative embodiment.

FIG. 11 shows an input image 1101 of a laptop including its palm rest and keyboard, with the output image 1115 correcting for the object position, orientation and capture angle. The input image 1101, for example, may be captured in a controlled setting such as in a repair center's photo booth during a visual mechanical inspection of the laptop. Here, the palm rest and keyboard has various damage (e.g., missing "I" and "L" keys, missing right click button on the touchpad, etc.). As discussed above, by knowing the type of damage, a determination may be made as to whether suitable replacement parts (e.g., keys and buttons) are available. If not, such replacement parts may be ordered automatically.

Figure 12:
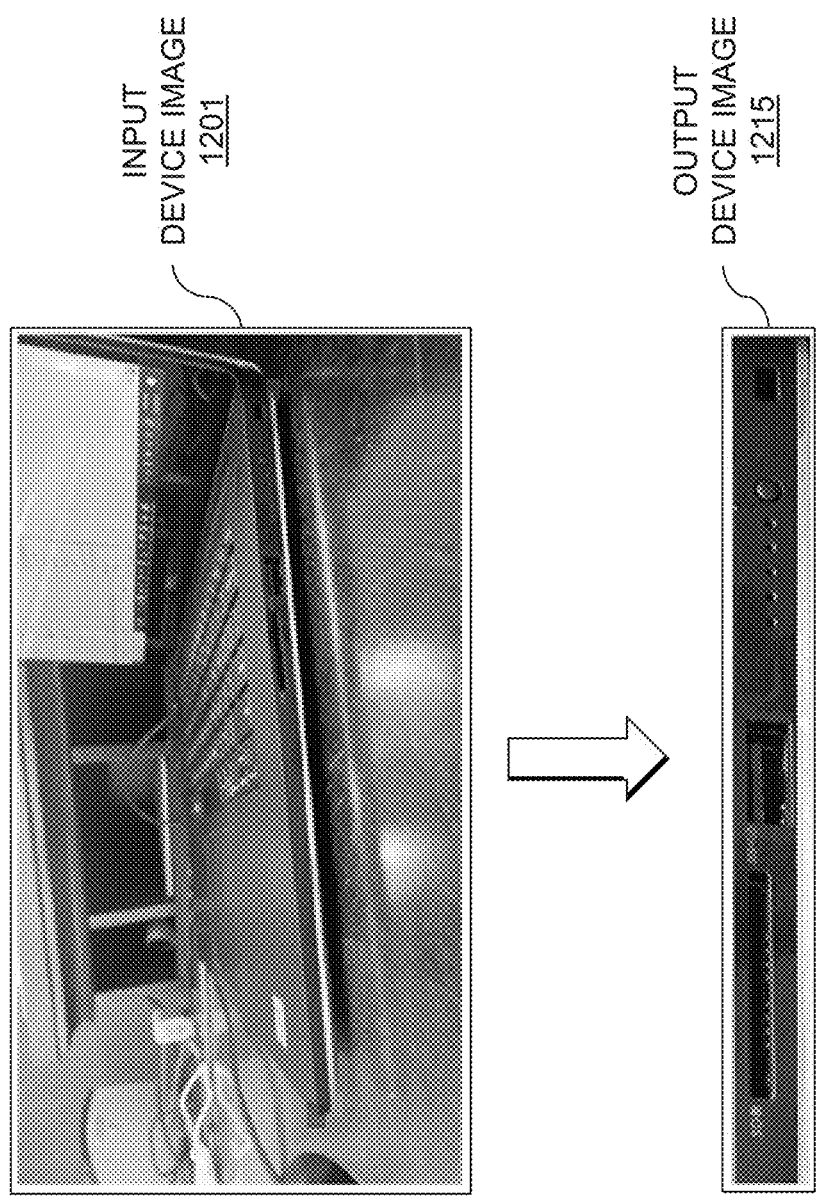
FIG. 12 shows another example of an input device image and an output device image following processing using the FIG. 3 process flow in an illustrative embodiment.

FIG. 12 shows an input image 1201 of a laptop including its side ports, with the output image 1215 correcting for the object position, orientation and capture angle. The input image 1201, for example, may be captured using an end-user's smartphone and be provided to a support platform or repair center when seeking servicing of the laptop. Here, the ports may be viewed by a support technician to determine availability of connections to external devices that may be useful in diagnosis and/or repair of damage or issue(s) encountered on the laptop, for determining whether ports are damaged and need to be repaired or replaced, etc. If so, the availability of suitable replacement parts may be determined, and if suitable replacement parts are not available, they may be ordered automatically.

It should be appreciated that FIGS. 8-12 are presented by way of example only, to illustrate application of the FIG. 3 system flow for auto-cropping of device images in a variety of non-limiting use cases. Various other object types may be analyzed (e.g., of different parts or portions of laptops or other computing devices) using the FIG. 3 system flow.

Illustrative embodiments provide a number of advantages relative to conventional approaches. Auto-cropping methods described herein provide a solution that addresses variability in device images by using a unique deep learning-based approach that automatically pinpoints corners of an object (e.g., corners of a rectangular shaped object) and uses an augmentation function (e.g., a trapezoidal augmentation function) to transform device images to a standard shape (e.g., a standard rectangular shape). The auto-cropping methods described herein enable near-infinite optionality on how device images can be captured and works with any device image regardless of background noise, object position, object orientation, and object capture angle. Standardization of device images provides various advantages, such as solving the problem of variability of device image collection processes, increasing focus on specific objects, and improving training dataset quality for further AI development (e.g., of deep learning or other machine learning models used to process device images).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for service request processing utilizing modified versions of images of computing devices will now be described in greater detail with reference to FIGS. 13 and 14. Although described in the context of system 100, these platforms may also be used to implement at least portions of other information processing systems in other embodiments.

Figure 13:
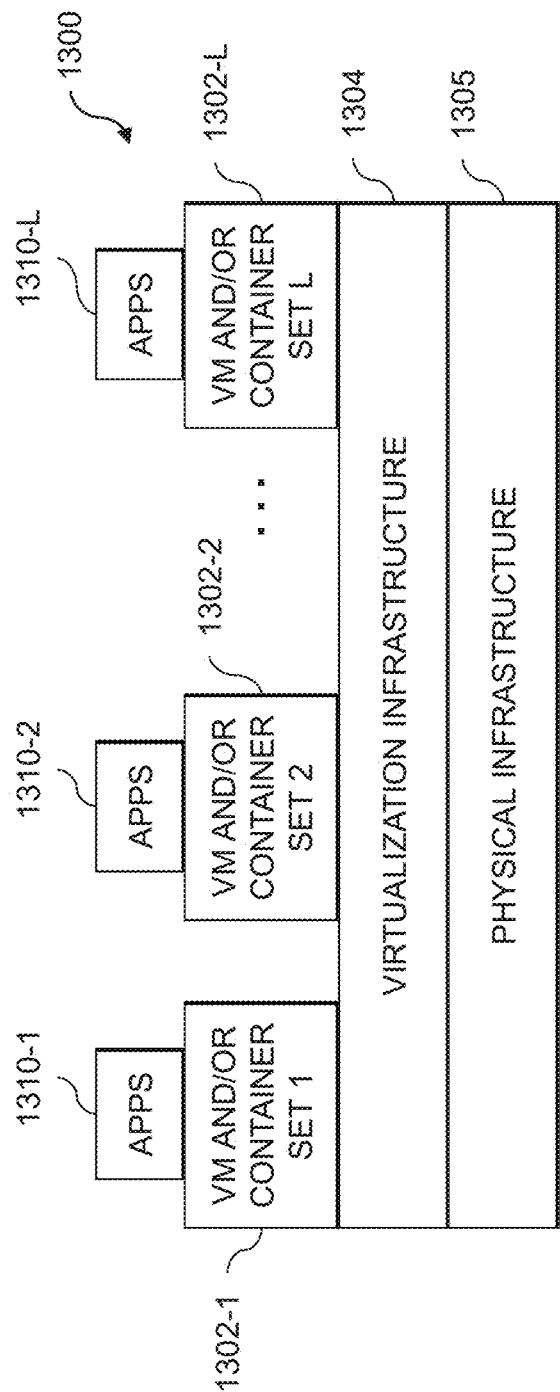
FIGS. 13 and 14 show examples of processing platforms that may be utilized to implement at least a portion of an information processing system in illustrative embodiments.
Figure 14:
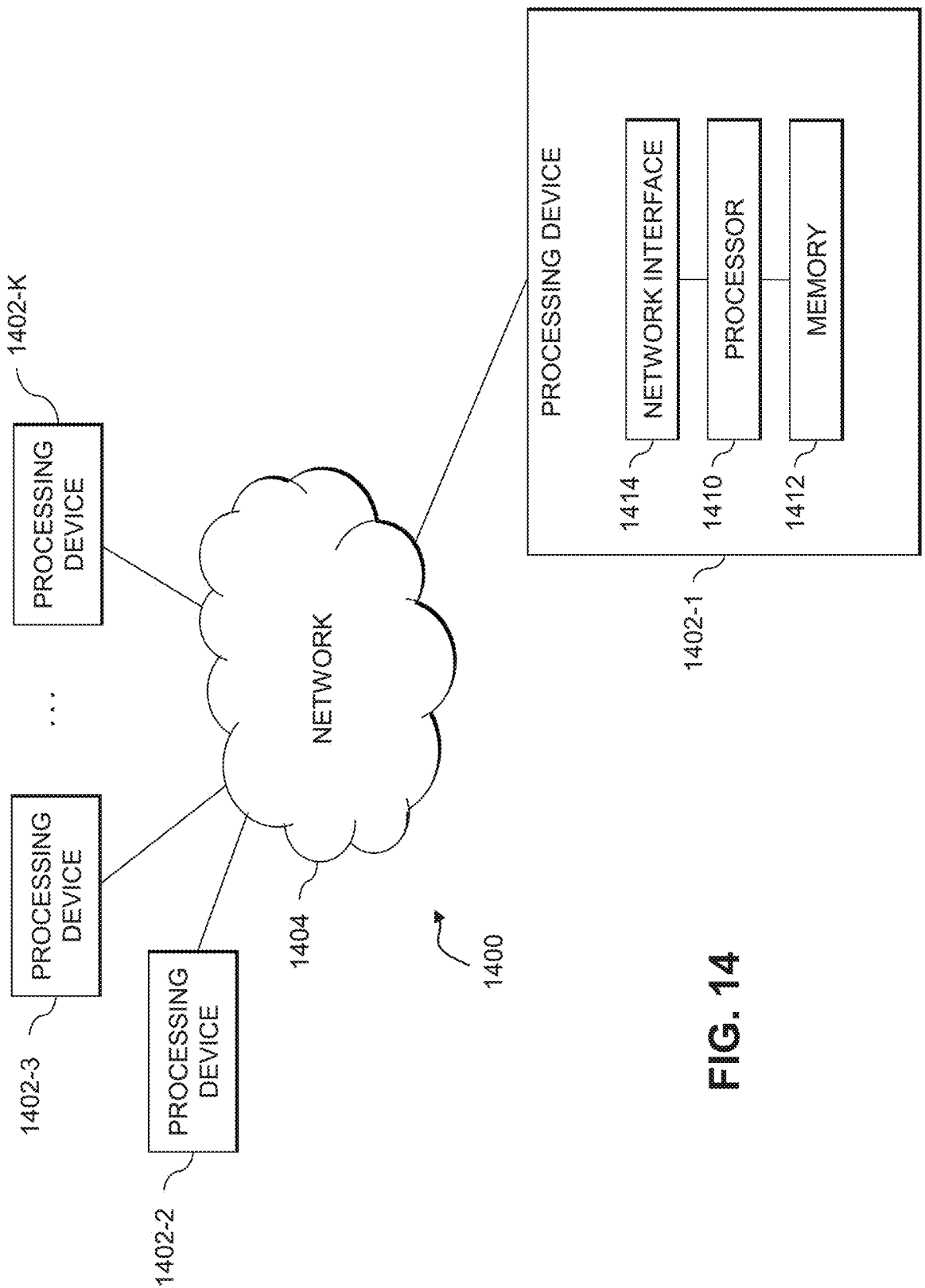

FIG. 13 shows an example processing platform comprising cloud infrastructure 1300. The cloud infrastructure 1300 comprises a combination of physical and virtual processing resources that may be utilized to implement at least a portion of the information processing system 100 in FIG. 1. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for service request processing utilizing modified versions of images of computing devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, images, machine learning models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
   obtaining a first image;
   detecting one or more designated types of objects in the first image, at least a given one of the one or more designated types of objects comprising at least a given portion of a computing device associated with a service request, the service request comprising a request for at least one of troubleshooting and remediating one or more issues encountered on the computing device;
   responsive to detecting the given one of the one or more designated types of objects in the first image, identifying features of the given portion of the computing device in the first image;
   performing an augmentation of the identified features of the given portion of the computing device to generate a second image, the second image comprising a modified version of the first image that contains the given portion of the computing device and excludes one or more other portions of the first image; and
   processing the service request utilizing the second image.

2. The apparatus of claim 1 wherein detecting the one or more designated types of objects in the first image utilizes an object detection machine learning model.

3. The apparatus of claim 2 wherein the object detection machine learning model outputs a first value if the given one of the one or more designated types of objects are detected in the image and outputs a second value if the given one of the one or more designated types of objects are not detected in the image.

4. The apparatus of claim 1 wherein the identified features of the given portion of the computing device comprises corners of the given portion of the computing device, and wherein identifying the features of the given portion of the computing device in first image utilizes a corners prediction machine learning model.

5. The apparatus of claim 4 wherein the corners prediction machine learning model utilizes object detection to make predictions for each of a set of corner classes and outputs one or more predictions of locations of the corners of the given portion of the computing device in a designated coordinate format.

6. The apparatus of claim 5 wherein the designated coordinate format comprises a normalized coordinate format.

7. The apparatus of claim 5 wherein the designated coordinate format comprises a normalized coordinate format that specifies center coordinates of the given portion of the computing device in the first image and a bounding box width and height of the given portion of the computing device in the first image.

8. The apparatus of claim 5 wherein the set of corner classes comprises four corner classes and each of the one or more predictions comprises coordinates of locations of four corners of the given portion of the computing device in the first image.

9. The apparatus of claim 8 wherein performing the augmentation of the identified features of the given portion of the computing device to generate the second image comprises performing a trapezoidal augmentation that stretches each of the four corners of the given portion of the computing device in the first image to a predefined image resolution.

10. The apparatus of claim 9 wherein the trapezoidal augmentation takes as input a first list comprising the predicted coordinates of the locations of the four corners of the given portion of the computing device in the first image and a second list comprising the predefined image resolution, and applies a transformation to the first list to produce the second image with the predefined image resolution specified in the second list.

11. The apparatus of claim 1 wherein the given portion of the computing device comprises a screen of the computing device.

12. The apparatus of claim 1 wherein the given portion of the computing device comprises a set of ports of the computing device.

13. The apparatus of claim 1 wherein processing the service request utilizing the second image comprises classifying a type of damage associated with at least one component of the computing device based at least in part on one or more visual characteristics of the given portion of the computing device in the second image.

14. The apparatus of claim 1 wherein processing the service request utilizing the second image comprises classifying a type of at least one of the one or more issues encountered on the computing device based at least in part on one or more visual characteristics of the given portion of the computing device in the second image.

15. A computer program product comprising a non-transitory processor-readable storage medium having stored therein program code of one or more software programs, wherein the program code when executed by at least one processing device causes the at least one processing device to perform steps of:
obtaining a first image;
detecting one or more designated types of objects in the first image, at least a given one of the one or more designated types of objects comprising at least a given portion of a computing device associated with a service request, the service request comprising a request for at least one of troubleshooting and remediating one or more issues encountered on the computing device;
responsive to detecting the given one of the one or more designated types of objects in the first image, identifying features of the given portion of the computing device in the first image;
performing an augmentation of the identified features of the given portion of the computing device to generate a second image, the second image comprising a modified version of the first image that contains the given portion of the computing device and excludes one or more other portions of the first image; and
processing the service request utilizing the second image.

16. The computer program product of claim 15 wherein the identified features of the given portion of the computing device comprises corners of the given portion of the computing device, and wherein identifying the features of the given portion of the computing device in first image utilizes a corners prediction machine learning model to make predictions for each of a set of corner classes and outputs one or more predictions of locations of the corners of the given portion of the computing device in a designated coordinate format.

17. The computer program product of claim 16 wherein the set of corner classes comprises four corner classes and each of the one or more predictions comprises coordinates of locations of four corners of the given portion of the computing device in the first image, and wherein performing the augmentation of the identified features of the given portion of the computing device to generate the second image comprises performing a trapezoidal augmentation that stretches each of the four corners of the given portion of the computing device in the first image to a predefined image resolution.

18. A method comprising steps of:
obtaining a first image;
detecting one or more designated types of objects in the first image, at least a given one of the one or more designated types of objects comprising at least a given portion of a computing device associated with a service request, the service request comprising a request for at least one of troubleshooting and remediating one or more issues encountered on the computing device;
responsive to detecting the given one of the one or more designated types of objects in the first image, identifying features of the given portion of the computing device in the first image;
performing an augmentation of the identified features of the given portion of the computing device to generate a second image, the second image comprising a modified version of the first image that contains the given portion of the computing device and excludes one or more other portions of the first image; and
processing the service request utilizing the second image;
wherein the method is performed by at least one processing device comprising a processor coupled to a memory.

19. The method of claim 18 wherein the identified features of the given portion of the computing device comprises corners of the given portion of the computing device, and wherein identifying the features of the given portion of the computing device in first image utilizes a corners prediction machine learning model to make predictions for each of a set of corner classes and outputs one or more predictions of locations of the corners of the given portion of the computing device in a designated coordinate format.

20. The method of claim 19 wherein the set of corner classes comprises four corner classes and each of the one or more predictions comprises coordinates of locations of four corners of the given portion of the computing device in the first image, and wherein performing the augmentation of the identified features of the given portion of the computing device to generate the second image comprises performing a trapezoidal augmentation that stretches each of the four corners of the given portion of the computing device in the first image to a predefined image resolution.

* * * * *